(12) United States Patent
Huang et al.

(10) Patent No.: US 11,597,154 B2
(45) Date of Patent: Mar. 7, 2023

(54) COLOR REPRESENTATION OF A PROPERTY OF A 3D OBJECT

(71) Applicant: Hewlett-Packard Development Company, L.P., Spring, TX (US)

(72) Inventors: Wei Huang, Palo Alto, CA (US); Ingeborg Tastl, Palo Alto, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 64 days.

(21) Appl. No.: 16/473,434

(22) PCT Filed: Apr. 27, 2017

(86) PCT No.: PCT/US2017/029883
§ 371 (c)(1),
(2) Date: Jun. 25, 2019

(87) PCT Pub. No.: WO2018/199960
PCT Pub. Date: Nov. 1, 2018

(65) Prior Publication Data
US 2020/0147892 A1   May 14, 2020

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/112* (2017.08); *B29C 64/209* (2017.08);
(Continued)

(58) Field of Classification Search
None
See application file for complete search history.

(56) References Cited

U.S. PATENT DOCUMENTS 8,509,933 B2   8/2013  Steingart et al.
9,305,391 B2   4/2016  Tipton
(Continued)

FOREIGN PATENT DOCUMENTS

CN   101063811   10/2007
CN   104640686    5/2015
(Continued)

OTHER PUBLICATIONS

Oxman (Neri Oxman (2011) Variable property rapid prototyping, Virtual and Physical Prototyping, 6:1, 3-31, DOI: 10.1080/17452759. 2011.558588, https://oxman.com/files/Variable-Property-Rapid-Prototyping-(2011).pdf) (Year: 2011).*
(Continued)

*Primary Examiner* — Matthew J Daniels
*Assistant Examiner* — Andrew L Swanson
(74) *Attorney, Agent, or Firm* — Shook, Hardy & Bacon L.L.P.

(57) ABSTRACT

A device includes a material dispenser and a fluid dispenser. The material dispenser is to dispense a build material layer-by-layer, to at least partially additively form a first 3D object. The fluid dispenser is to dispense at least one fluid agent at selectable exterior voxel locations of the respective layers to at least partially define an external surface of the first 3D object as a first color to represent a first non-color material property of at least a first portion of the first 3D object. The selection of the first color is independent of characteristics of the first non-color material property.

11 Claims, 6 Drawing Sheets

(51) Int. Cl.
  *B33Y 30/00* (2015.01)
  *B33Y 50/02* (2015.01)
  *B29C 64/112* (2017.01)
  *B29C 64/209* (2017.01)

(52) U.S. Cl.
  CPC .............. *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2002/0167101 | A1 | 11/2002 | Tochimoto et al. |
| 2010/0249979 | A1 | 9/2010 | John et al. |
| 2013/0287933 | A1* | 10/2013 | Kaiser .................. B29C 64/112 427/9 |
| 2014/0277661 | A1* | 9/2014 | Amadio ............. G05B 19/4099 700/97 |
| 2014/0312535 | A1 | 10/2014 | Dikovsky et al. |
| 2015/0149126 | A1 | 5/2015 | Maes et al. |
| 2015/0253585 | A1 | 9/2015 | Anatole et al. |
| 2015/0258770 | A1 | 9/2015 | Chan et al. |
| 2016/0311162 | A1 | 10/2016 | Liu et al. |

FOREIGN PATENT DOCUMENTS

| | | | |
|---|---|---|---|
| CN | 106794633 A | | 5/2017 |
| EP | 3132919 | | 2/2017 |
| JP | 2016144900 A | | 8/2016 |
| WO | WO-2016050300 A1 * | 4/2016 | ............... H04N 1/60 |
| WO | WO-2016171649 | | 10/2016 |
| WO | WO-2016175813 | | 11/2016 |

OTHER PUBLICATIONS

Zhou, Q-Y et al., Color Map Optimization for 3d Reconstruction with Consumer Depth Cameras, May 10, 2014 < http://vladlen.info/papers/color-mapping.pdf >.

* cited by examiner

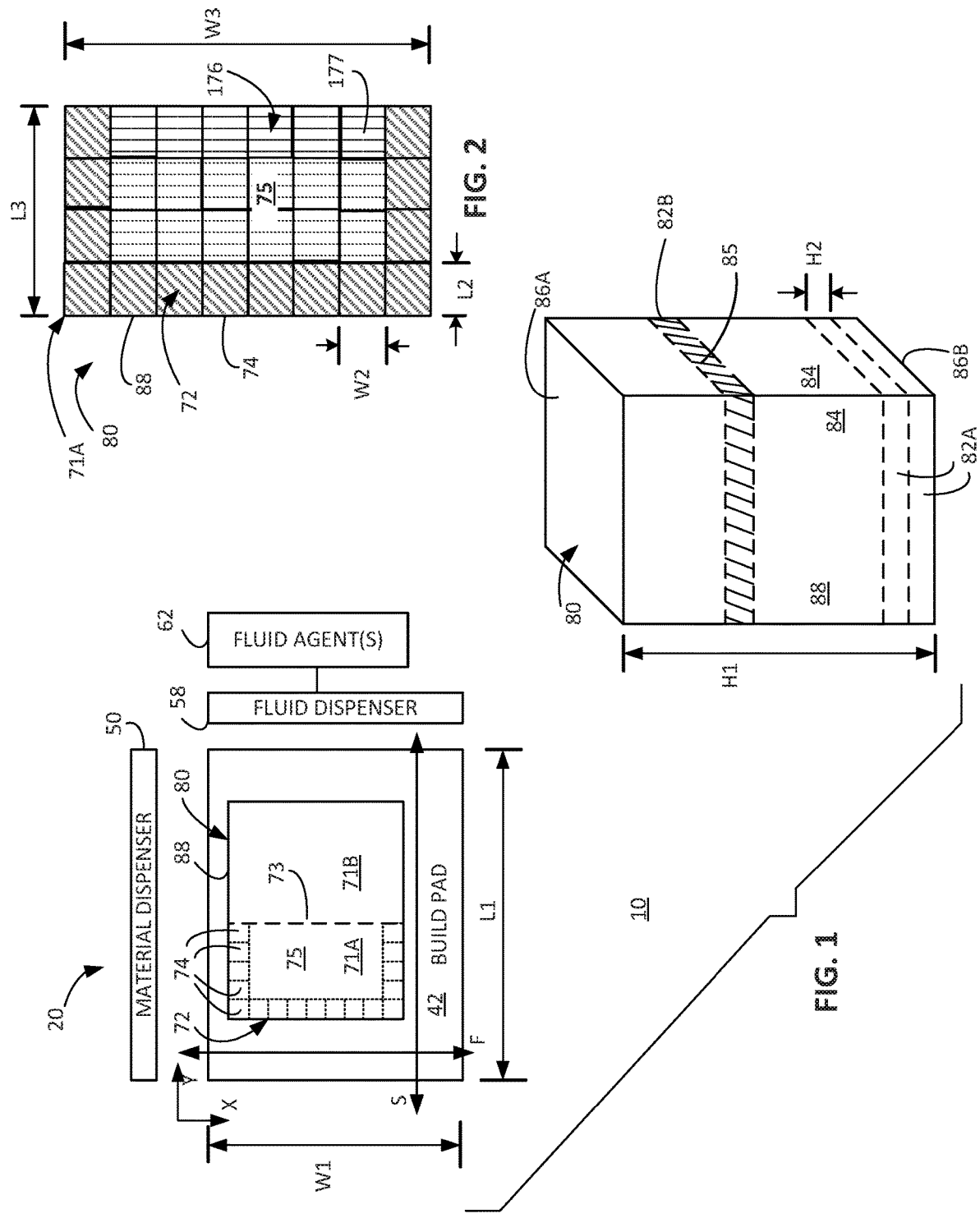

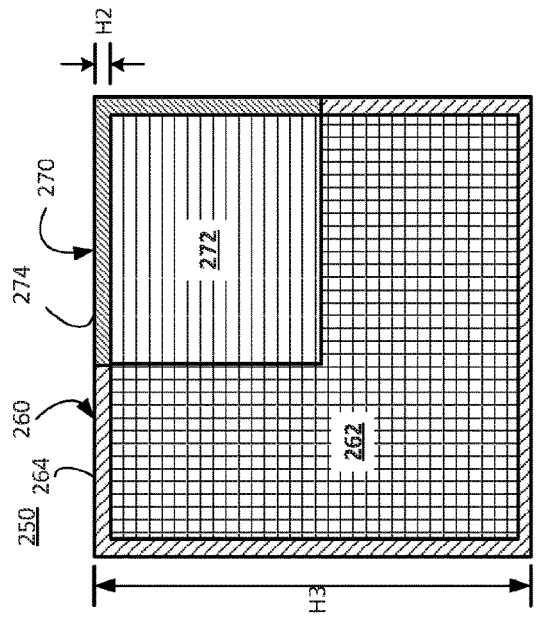
FIG. 4A
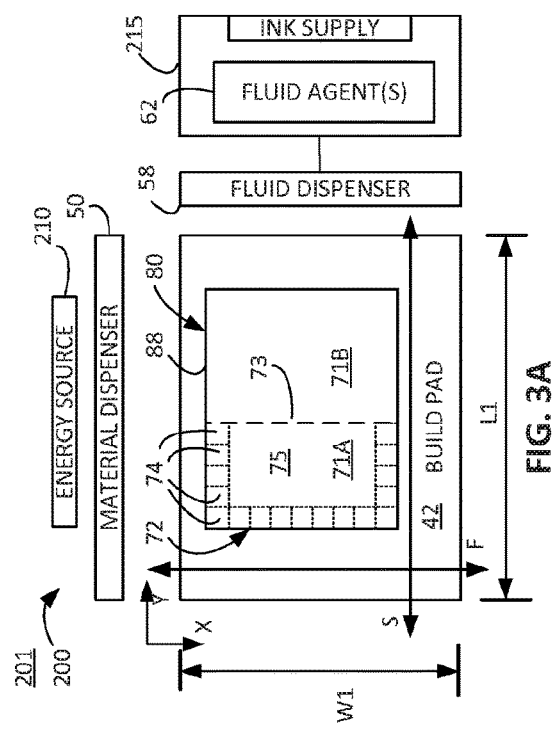
FIG. 3A
FIG. 4B
FIG. 4C
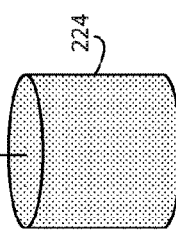
FIG. 3B

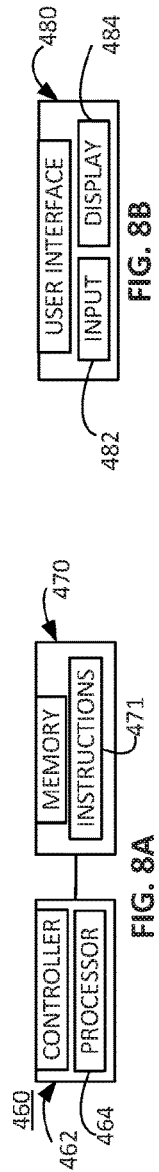
FIG. 8A
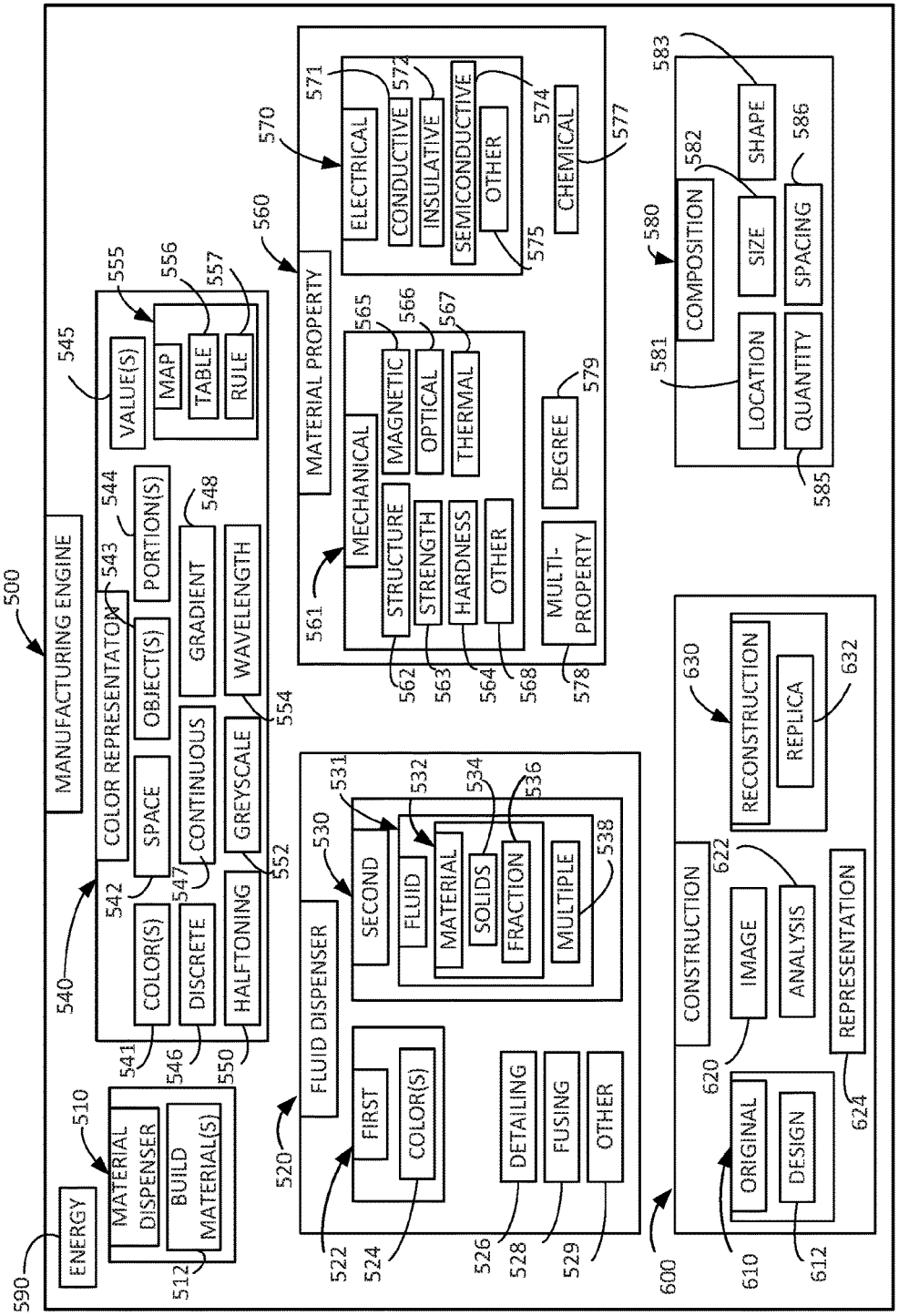
FIG. 8B
FIG. 9

COLOR REPRESENTATION OF A PROPERTY OF A 3D OBJECT

BACKGROUND

Additive manufacturing may revolutionize design and manufacturing in producing three-dimensional (3D) objects. Some forms of additive manufacturing may sometimes be referred to as 3D printing. Some additively manufactured 3D objects may have functional and/or aesthetic characteristics.

BRIEF DESCRIPTION OF THE DRAWINGS

FIG. 1 is a block diagram schematically representing an example device to additively manufacture an example 3D object.

FIG. 2 is a partial top sectional view schematically representing a portion of an example 3D object.

FIG. 3A is a block diagram schematically representing an example device to additively manufacture an example 3D object.

FIG. 3B is a block diagram schematically representing an example imager.

FIG. 4A is a sectional view schematically representing an example 3D object.

FIGS. 4B-4C are each a diagram including a table schematically representing example color mappings.

FIG. 8A is a block diagram schematically representing an example control portion.

FIG. 8B is a block diagram schematically representing an example user interface.

FIG. 9 is a block diagram schematically representing an example manufacturing engine.

DETAILED DESCRIPTION

Figure 4D:
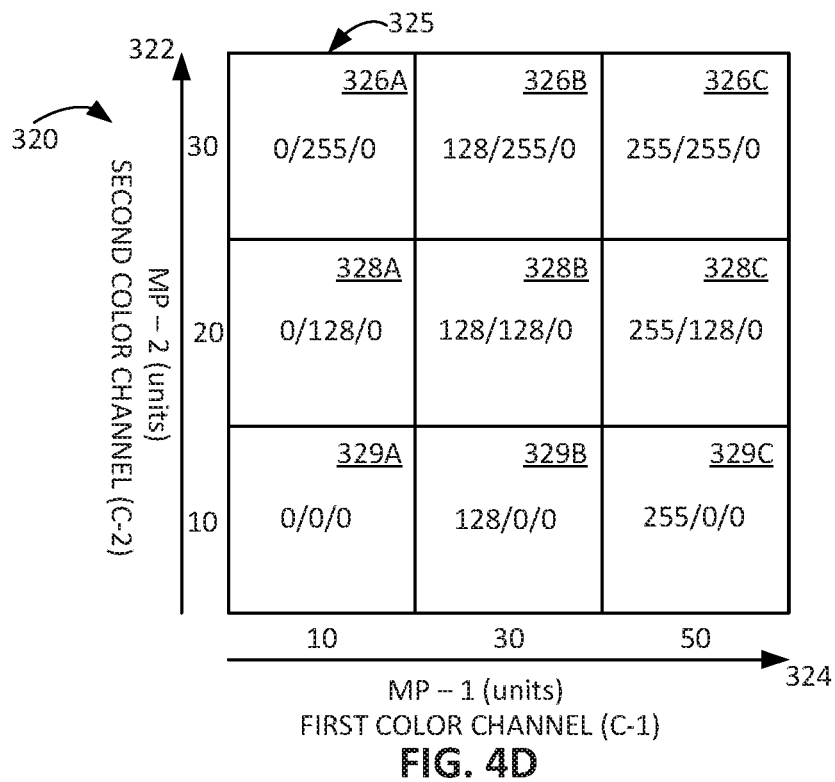
FIGS. 4D-F are each a diagram schematically representing example color mapping.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure may employ a 3D color surface map to represent at least some underlying material properties within a 3D object.

In some examples, a device comprises a material dispenser to dispense a build material, layer-by-layer, to at least partially additively form a first 3D object. In some examples, the device comprises a fluid dispenser to dispense at least one fluid agent at selectable exterior voxel locations of the respective layers to at least partially define an external surface of the first 3D object as a first color to represent a first non-color material property of at least a first portion of the first 3D object.

In some examples, a one-to-one correspondence exists between the first color and the first non-color material property (represented via the first color). In some examples, this one-to-one correspondence may sometimes be referred to as an exclusive representation by the first color of the first non-color material property.

In some examples, the dispenser is to dispense a fluid agent(s) to cause a second color to at least partially define an external surface of a second portion of the same 3D object with the assigned color to represent a different second non-color material property forming the second portion, or represent a different second value of same first non-color material property which also forms the first portion of the same 3D object.

In some such examples, a size, shape, and location of the respective first and second colors defining the external surface of the 3D object represent a material property distribution of the 3D object. Via such arrangements, one can quickly and easily understand a big picture of how material properties are distributed throughout a 3D object.

In at least some examples, such application of color at the exterior voxel locations does not generally affect the interior voxel locations underlying the exterior voxel locations. Moreover, the color may be printed at the external surface during additive manufacturing with little to no extra time, material or cost.

In some examples, the term "non-color material property" refers to a principle that a material property of interest is not a color.

In some examples, the selection of the first color is independent of characteristics of the first non-color material property. For instance, one first non-color material property may be a hardness of the material in the particular portion of the 3D object (or the whole 3D object), and the color selected to represent that hardness is completely unrelated to the value of the hardness, unrelated to the type of build material used for that particular portion, etc.

In some examples, to the extent that the non-color material property is already exhibited by the build material (prior to use in forming a 3D object), exhibits the non-color material property after formation (in a particular structural configuration), and/or exhibits the non-color material property after being infused with a fluid agent via the fluid dispenser and fused through the energy dispenser, then the non-color material property may sometimes be referred to as being an intrinsic characteristic of the material forming the particular portion of the 3D object and to which the particular assigned color corresponds. With this in mind, in at least some examples, the basis for selecting a color to represent such intrinsic non-color material properties is independent of (i.e. unrelated to, does not flow from) the nature of the respective intrinsic non-color material property. Hence, in some examples, the basis for selecting the representative color for assignment to correspond to the non-color material property may be sometimes be referred to as being generally arbitrary relative to the characteristics of the non-color material property.

In some examples, multiple 3D objects of the same shape and size, but having different non-color material properties (or different values of the same non-color material property), may be manufactured simultaneously on the same build pad. In such examples, each different object may be manufactured to exhibit a different color on its external surface than the other 3D objects, which in turn may enable the respective 3D objects to be easily distinguishable from each other both by humans and machines (e.g. computer vision).

In some examples, a color 3D object formed via at least some examples of the present disclosure may be a component or part of a larger object or assembly, where the component or part is itself a color 3D object already including a 3D color surface voxel representation of non-color material properties exhibited by the part. This example implementation may permit reconstruction of a part of an assembly (e.g. mechanism) for which a commercially available replacement part is no longer available or reasonably accessible. Perhaps the part may be broken or a duplicate may be desired where the larger assembly includes multiple such parts or a similar assembly has such a part missing. Alternatively, the design file for the original 3D object may be unavailable.

In such situations, at least some examples of the present disclosure provide for obtaining a color 3D image of the color 3D part and analyzing the 3D color surface voxel representation taken from the 3D image to determine the respective non-color material properties of the color 3D part. This information is then used to additively manufacture a 3D replica of the color 3D part, with the 3D replica exhibiting the same 3D color surface voxel representation and non-color material property distribution as the original 3D part.

In one aspect, the 3D replica may exhibit a resolution in non-color material properties and surface color which is generally the same as the resolution of original 3D image which was reconstructed via the obtained 3D image. Moreover, in an original construction or in a reconstruction, the 3D color surface voxel representation may exhibit substantially the same resolution as the resolution of the interior voxel locations exhibiting the corresponding non-color material property.

In some examples, such original construction and/or reconstruction may facilitate implementation of a "blended reality" paradigm of relatively easy migration back-and-forth between digital and concrete expressions of an object.

In some examples, when desired such a 3D replica may be produced on a different scale than the original 3D object.

In some examples, while maintaining a one-to-one correspondence between the originally assigned color(s) and their respectively represented non-color material properties, the 3D replica may be produced with substitute colors when desired, although new color mapping expressing the substitution would be expected for the recipient of the 3D replica.

These examples, and additional examples, are described further in association with at least FIGS. 1-10.

FIG. 1 is a diagram 10 schematically representing an example device 20 to additively manufacture an example 3D object 80. In some examples, the device 20 comprises a material dispenser 50 and a fluid dispenser 58.

The material dispenser 50 is arranged to dispense a build material layer-by-layer onto a build pad 42 to at least partially additively form the 3D object 80. 1. Once formed, the 3D object 80 may be separated from the build pad 42. It will be understood that a 3D object of any shape and any size can be manufactured, and the object 80 depicted in FIG. 1 provides just one example shape and size of a 3D object. In some instances device 20 may sometimes be referred to as a 3D printer. Accordingly, the build pad 42 may sometimes be referred to as a print bed or a receiving surface.

It will be understood that the material dispenser 50 may be implemented via a variety of electromechanical or mechanical mechanisms, such as doctor blades, slot dies, extruders, and/or other structures suitable to spread, deposit, and/or otherwise form a coating of the build material in a generally uniform layer relative to the build pad 42 or relative to a previously deposited layer of build material.

In some examples, the material dispenser 50 has a length (L1) at least generally matching an entire length (L1) of the build pad 42, such that the material dispenser 50 is capable of coating the entire build pad 42 with a layer 82A of build material in a single pass as the material dispenser 50 travels the width (W1) of the build pad 42. In some examples, the material dispenser 50 can selectively deposit layers of material in lengths and patterns less than a full length of the material dispenser 50. In some examples, the material dispenser 50 may coat the build pad 42 with a layer 82A of build material(s) using multiple passes instead of a single pass.

It will be further understood that a 3D object additively formed via device 20 may have a width and/or a length less than a width (W1) and/or length (L1) of the build pad 42.

In some examples, the material dispenser 50 moves in a first orientation (represented by directional arrow F) while the fluid dispenser 58 moves in a second orientation (represented by directional arrow S) generally perpendicular to the first orientation. In some examples, the material dispenser 50 can deposit material in each pass of a back-and-forth travel path along the first orientation while the fluid dispenser 58 can deposit fluid agents in each pass of a back-and-forth travel path along the second orientation. In at least some examples, one pass is completed by the material dispenser 50, followed by a pass of the fluid dispenser 58 before a second pass of the material dispenser 50 is initiated, and so on.

In some examples, the material dispenser 50 and the fluid dispenser 58 can be arranged to move in the same orientation, either the first orientation (F) or the second orientation (S). In some such examples, the material dispenser 50 and the fluid dispenser 58 may be supported and moved via a single carriage while in some such examples, the material dispenser 50 and dispenser 58 may be supported and moved via separate, independent carriages.

In some examples, the build material used to generally form the 3D object comprises a polymer material. In some examples, the polymer material comprises a polyamide material. However, a broad range of polymer materials may be employed as the build material. In some examples, the build material may comprise a ceramic material. In some examples, the build material may take the form of a powder while in some examples, the build material may take a non-powder form, such as liquid or filament. Regardless of the particular form, at least some examples of the build material is suitable for spreading, depositing, extruding, flowing, etc. in a form to produce layers (via material dispenser 50) additively relative to build pad 42 and/or relative to previously formed first layers of the build material.

In some examples, the build material does not significantly exhibit (at least some of the mechanical, electrical, chemical properties, etc. identified in association with at least FIG. 9. However, if desired, at least some of these various properties may be infused into the build material to at least some degree via fluid agent(s) 62 (and via an energy source, in some examples), as later described below in more detail in association with at least FIG. 1-4A, and FIG. 9. Moreover, in some examples, one can select a build material which already incorporates at least some of these properties prior employing the build material in forming the 3D object.

In some examples, the fluid dispenser 58 shown in FIG. 1 comprises a printing mechanism, such as an array of printheads, each including a plurality of individually addressable nozzles for selectively ejecting fluid agents onto a layer of build material. Accordingly, in some examples, the fluid dispenser 58 may sometimes be referred to as an addressable fluid ejection array. In some examples, the fluid dispenser 58 may eject individual droplets having a volume on the order of ones of picoliters or on the order of ones of nanoliters.

In some examples, fluid dispenser 58 comprises a thermal inkjet (TIJ) array. In some examples, fluid dispenser 58 may comprise a piezoelectric inkjet (PIJ) array or other technologies such as aerosol jetting, anyone of which can precisely, selectively deposit a small volume of fluid. In some examples, fluid dispenser 58 may comprise continuous inkjet technology.

In some examples, the fluid dispenser 58 selective dispenses droplets on a voxel-by-voxel basis. In one sense a voxel may be understood as a unit of volume in a three-dimensional space. In some examples, a resolution of 1200 voxels per inch in the x-y plane is implemented via fluid dispenser 58. In some examples, a voxel may have a height H2 (or thickness) of about 100 microns, although a height of the voxel may fall between about 80 microns and about 100 microns. However, in some examples, a height of a voxel may fall outside the range of about 80 to about 100 microns.

In some examples, the fluid dispenser 58 has a width (W1) at least generally matching an entire width (W1) of the build pad 42, and therefore may sometimes be referred to as providing page-wide manufacturing (e.g. page wide printing). In such examples, via this arrangement the fluid dispenser 58 can deposit fluid agents onto the entire receiving surface in a single pass as the fluid dispenser 58 travels the length (L1) of the build pad 42. In some examples, the fluid dispenser 58 may deposit fluid agents onto a given layer of material using multiple passes instead of a single pass.

In some examples, fluid dispenser 58 may comprise, or be in fluid communication with, an array of reservoirs to contain various fluid agents 62. In some examples, the array of reservoirs may comprise an ink supply 215, as shown in FIG. 3A. In some examples, at least some of the fluid agents 62 may comprise a fusing agent, detailing agent, etc. to enhance formation of each layer 82A of build material. In particular, upon application onto the build material at selectable positions via the fluid dispenser 58, the respective fusing agent and/or detailing agent may diffuse, saturate, and/or blend into the respective layer of the build material at the selectable positions.

In some examples and as further described later throughout at least some examples of the present disclosure, the fluid dispenser 58 may deposit fluid agents to influence a material property of the to-be-formed 3D object and/or may deposit color(s) agents to at least partially define an external surface of a 3D object.

Moreover, during formation of a desired number of layers 82A of the build material, in some examples the fluid dispenser 58 may selectively dispense droplets of fluid agent(s) 62 at some selectable locations 74 of each respective layer 82A to at least partially define an external surface 88 of the 3D object. It will be understood that a group 72 of selectable locations 74, or multiple different groups 72 of selectable locations 74 may be selected in any position, any size, any shape, and/or combination of shapes.

In some examples, the at least some selectable locations 72 may comprise selectable locations corresponding to an entire external surface of a 3D object or an entire component of a multi-component 3D object. In some examples, the at least some selected locations correspond to an entire region of a 3D object, such as but not limited to an end portion, middle, etc.

In some examples, each respective selectable location 74 corresponds to a single exterior voxel.

In some examples, each respective selectable location 74 corresponds to a group of exterior voxels. In some such examples, each selectable location 74 may have a depth of more than one voxel, such as at least two voxels sufficient to form a robust color representation defining the external surface 88 of the 3D object 80.

FIG. 2 is an enlarged partial sectional view (e.g. a horizontal slice) which provides a further illustration of a portion of the example 3D object 80 in which a group 72 of exterior voxel locations 74 define the external surface 88 of 3D object 80 and a group 176 of interior voxel locations 177 define the interior 75 of a first portion 71A of the 3D object 80. In some examples, each voxel location 74, 177 comprises a width W2 and length L2, which forms a portion of a width W3 and a length L3 of first portion 71A. As previously noted, the exterior voxel locations 74 exhibit an assigned first color on external surface 88 to represent at least a first non-color material property of the interior 75 of first portion 71A.

As further shown in diagram 201 of FIG. 3A, in some examples a device 200 comprises at least substantially the same features and attributes as device 20 (FIG. 1) except further comprising at least an energy source 210 for irradiating the deposited build materials, fluid agents (e.g. fusing agent), etc. to cause heating of the material, which in turn results in the fusing of particles of the material relative to each other, with such fusing occurring via melting, sintering, etc. After such fusing, a layer 82A (e.g. FIG. 1) of build material is completely formed and additional layers 82A of build material may be formed in a similar manner as represented in FIG. 1.

In some examples, the energy source 210 may comprise a gas discharge illuminant, such as but not limited to a Halogen lamp. In some examples, the energy source 210 may comprise multiple energy sources. As previously noted, energy source 210 may be stationary or mobile and may operate in a single flash or multiple flash mode.

FIG. 3B is a block diagram 220 schematically representing an example imager 222. In some examples, imager 222 is employed in association with device 20, such as previously described in association with at least FIGS. 1-3A, and hereafter with at least FIGS. 4A-10.

As shown in FIG. 3B, in some examples the imager 222 may comprise a single 3D imager or multiple 2D imagers used in cooperation. Imager 222 may be stationary or may be movable in order to obtain a 3D image of a stationary 3D object 224. In some examples, imager 222 is located external to and independent of device 20 (FIG. 1), 200 (FIG. 3). However, in some examples, imager 222 may be located within the same environment as device 20.

As further shown in FIG. 3B, in some examples the obtained 3D image captures at least the geometry and surface color map of the 3D object 224. In some examples, the obtained 3D image may be expressed in a data file 230 storing at least the geometry 232 and surface color map 234, as shown in FIG. 3B. In some examples, the imager 222 may be controlled by and/or in communication with a control portion, such as control portion 460 (FIG. 8A) and/or in association with manufacturing engine 500 (FIG. 9). One example implementation of imager 222 may comprise a SPROUT® 3D imager available from HP, Inc. Imager 222 is further described later in association with at least FIG. 9 regarding image function 620 of construction engine 600 for use in constructing an original 3D object and/or in association with a method 900 of reconstruction in association with at least FIG. 10.

In some examples the device 20 can be used to additively form a 3D object via a MultiJet Fusion (MJF) process (available from HP, Inc.). In some examples, an additive manufacturing process performed via device 20 may omit at least some aspects of and/or may include at least some aspects of: selective laser sintering (SLS); selective laser melting (SLM); 3D binder printing (e.g. 3D binder jetting); fused deposition modeling (FDM); stereolithography (SLA); or curable liquid photopolymer jetting (Polyjet).

With these general components of device 20 in mind, one example formation of an example 3D object 80 is described.

As shown in FIG. 1, device 20 manufactures 3D object 80 by forming a selectable number of layers 82A of a build material. This formation includes using material dispenser 50 to coat the build pad 42 (or a preceding layer 82A) with a layer 82A of the build material. In some examples, a fluid agent 62 (e.g. at least a fusing agent) is then applied via fluid dispenser 58 at selectable portions on the current layer 82A. In some examples, irradiation of these selectable portions by the energy source 210 (FIG. 3A) results in fusing of the build material, fusing agents, detailing agents, etc. In some examples, this cycle of coating, dispensing and fusing is repeated until a selected number of layers 82A of build material is formed into 3D object 80 as shown in at least FIG. 1.

During the preceding method, as each layer 82A is being formed, the fluid dispenser 58 dispenses an assigned color at selectable exterior voxel locations 74 of at least some respective layers 82A, as shown in FIG. 1.

In some examples, the assigned color(s) at these exterior voxel locations 74 will be visible upon completion of 3D object to enable recognition of the underlying non-color material property embodied in internal voxel locations (e.g. 177 in FIG. 2) of a 3D object.

In some examples, the first layer 82A (i.e. bottommost layer) at least partially forms a bottom 86B of the 3D object 80 with an assigned color at least partially defining the exterior voxel locations 74 of bottom 86B of 3D object 80.

In some examples, some of the selectable exterior voxel locations 74 may define the external surface 88 at sides 84 of 3D object 80.

Similarly, in some examples, at least some selectable locations 74 at which an assigned first color may be dispensed (to represent a first non-color material property) may occur an uppermost layer of the 3D object which defines a top surface 86A (FIG. 1) of the external surface 88 of the 3D object 80.

As further shown in FIG. 1, in some examples, the at least partially formed 3D object 80 comprises a first portion 71A and a second portion 71B with dashed line 73 representing a boundary between the first portion 71A.

In some examples, the first portion 71A corresponds to portions of the 3D object for which exterior voxel locations 74 are assigned a particular color to represent a particular non-color material property of the corresponding formed layer 82A of the 3D object at which the exterior voxel location is present.

In some examples, when the first portion 71A defines the entire or substantially the entire 3D object, then no portion of the 3D object 80 is designated as a second portion 71B.

In some examples, when the first portion 71A defines less than the whole 3D object, then in some instances, the second portion 71B may be assigned a second color to represent a second non-color material property exhibited by interior voxels within the second portion 71B. The second color may be dispensed at the corresponding exterior voxel locations 74 of the second portion 71B, as further described in association with at least FIG. 4A.

In some examples, a 3D object with at least two different portions exhibiting different non-color material properties (or different values of the same non-color material property) may sometimes be referred to as 3D object having a heterogeneous structure and the respective 3D color surface voxel representation (e.g. surface color map) may sometimes be referred to as exhibiting the heterogeneity material information.

As previously noted, the at least some selectable voxel locations 74 are defined at any one of a top 86A, bottom 86B, sides 84 of the 3D object 80. In some examples, at least some of the selectable voxel locations 74 (at which at least one assigned color is dispensed) may be contiguous over a transition between adjacent sides 84, from a bottom 86B to a side 84, etc. or any other change in orientation, angle, etc. which may present a discontinuity or change in surface topology.

However, in some examples, such discontinuities or transitions may sometimes correspond to a transition or boundary between a first portion 71A exhibiting a first non-color material property (or a first value of a first non-color material property) and second portion 71B exhibiting a different, second non-color material property (or a second value of the first non-color material property) of 3D object 80. In such examples, each respective first and second portions 71A, 71B exhibit a different assigned color at their exterior voxel locations.

Several examples of at least some aspects of additively manufacturing a 3D object are described below in association with at least FIGS. 4A-10. In some examples, each of the various aspects described in association with at least FIGS. 4A-10 comprise at least some of substantially the same features and attributes as previously described for device 20, 200 in association with FIG. 1-3.

FIG. 4A is a sectional view schematically representing an example 3D object 250. In some examples, 3D object 250 may be formed via at least some of substantially the same features and attributes for additively manufacturing a 3D object (with an assigned 3D color surface voxel representation) as previously described in association with at least FIGS. 1-3. As shown in FIG. 4A, 3D object 250 comprises a first portion 260 and a second portion 270. The first portion 260 comprises an interior portion 262 and exterior portion 264. Meanwhile, the second portion 270 comprises an interior portion 272 and exterior portion 274. Together, the exterior portion 264 of first portion 260 and the exterior portion 274 of second portion 270 define an external surface 288 for the entire 3D object 250.

In some examples at least the interior portion 262 of first portion 260 exhibits a first value of a first non-color material property, while the interior portion 272 of second portion 270 exhibits a different second value of the same first non-color material property. In some such examples, the exterior portion 264 of first portion 260 exhibits the same value of the non-color material property as the interior portion 262 while exterior portion 274 of second portion 270 exhibits the same value of the non-color material property as interior portion 272.

Accordingly, via fluid dispenser 58 a first color is assigned and dispensed as a fluid agent at the group of first exterior voxel locations, which define exterior portion 264 of first portion 260, in order to represent a first value of the first non-color material property for the interior 262 of first portion 260. A second color is assigned and dispensed as a fluid agent at the group of second exterior voxel locations, which define exterior portion 274 of second portion 270, in order to represent a different, second value of the first non-color material property for the second portion 270 of the first 3D object. In some examples, a selection of the respective first and second colors is independent of the characteristics of the respective first and second values of the first non-color material property. It will be understood that in at least some examples the first color and the second color each may comprise a combination of different colors, such as but not limited to, when a given color (e.g. first color agent or second color agent) is defined in a RGB color space, CMYK color space etc.

However, with further reference to FIG. 4A, in some examples at least the interior portion 262 of first portion 260 exhibits a first non-color material property, while at least the interior portion 272 of second portion 270 exhibits a different second non-color material property. Via fluid dispenser 58, a first color is assigned and dispensed as a fluid agent at the group of first exterior voxel locations (which define portion 264 of first portion 260) in order to represent the first non-color material property for the interior 262 of first portion 260. A second color is assigned and dispensed as a fluid agent at the group of second voxel locations (which define exterior portion 274 of second portion 270) in order to represent a different, second non-color material property for the second portion 270 of the first 3D object. The selection of the respective first and second colors is independent of the characteristics of the respective first and second non-color material properties.

In some examples, in order to achieve assignment of a different non-color material property for each of the respective different portions of the single 3D object (or different values of same non-color material property), the material dispenser 50 may build substantially the entire 3D object via layers using a single build material. As each layer is formed, the fluid dispenser 58 may dispense fluid agent(s) at interior voxel locations (e.g. 177 in FIG. 2) of the first portion 260 of the 3D object to produce the first non-color material property (or a first value of the first non-color material property) in the first portion and then may dispense different fluid agent(s) at interior voxel locations of the second portion 270 of the 3D object to produce the second non-color material property (or a second value of the first non-color material property) in the second portion of the 3D object.

Accordingly, via such arrangements upon visual inspection of a 3D color surface voxel representation on the exterior portions 264, 274 of the respective first and second portions 260, 270, one can readily determine a non-color material property distribution of interior portions 262, 272 throughout the 3D object.

FIG. 4B is a table 300 schematically representing an example color map arranged in a sample format for illustrative simplicity. In some examples, table 300 comprises one example implementation according to at least color mapping function 555 of at least color representation engine 540 of manufacturing engine 500 in FIG. 9. In one aspect, table 300 demonstrates at least some aspects of color mapping for a 3D color surface voxel representation of a 3D object for a single non-color material property (MP-1).

In one aspect, whether by table (FIGS. 4B, 4C; 556 in FIG. 9) or by rule (557 in FIG. 9), such color mapping establishes a one-to-one correspondence between assigned colors and the non-color material properties represented via such assigned colors.

With this in mind, as shown in FIG. 4B table 300 comprises columns 302, 306, 308 representing different color channels, such as Red, Green, and Blue, respectively when a RGB color scale is employed. Meanwhile column 304 identifies particular voxel locations expressed in three axis space (x, y, z), such as locations (1, 5, 10) and (1, 6, 10) with respective color assignments made via rows 310A, 310B. Similarly, as a further sample of color mapping, column 304 identifies a group of voxel locations (e.g. Group 1, Group 2) for which color assignments are made via rows 310C, 310D.

With this general arrangement in mind, in row 310C one voxel location (1, 5, 10) has RGB values of (25, 80, 30) while in row 310B, an adjacent second voxel location (1, 6, 10) has RGB values of (25, 80, 60).

As further shown in FIG. 4B, in row 310C one voxel location for Group 1 has RGB values of (255, 0, 0) signifying a Red only color, and in row 310D one voxel location for Group 2 has RGB values of (0, 0, 180) signifying a Blue only color. In some examples, the Group 1 of voxel locations may correspond to the assignment of a first color (e.g. Red) to represent a first value of first non-color material property (e.g. MP-1) of interior voxel locations underlying the exterior voxel locations of Group 1. Meanwhile, in some examples, the Group 2 of voxel locations may correspond to the assignment of a different second color (e.g. Blue) to represent a second value of the same first non-color material property (e.g. MP-1) of interior voxel locations underlying the exterior voxel locations of Group 2.

Rows 310A, 310B provide a similar example of a sample color mapping arrangement except with single voxel locations (1, 5, 10 and 1, 6, 10) instead of with groups of voxel locations.

FIG. 4C is a table 320 schematically representing an example color map arrangement. Table 320 in FIG. 4C comprises at least some of substantially the same features and attributes as table 300 (FIG. 4B), except for addressing multiple different material properties, e.g. MP-1, MP-2, MP-3 instead of just one non-color material property (e.g. MP-1) in FIG. 4B. For instance, table 320 represents a first non-color material property (MP-1) at column 302, a second non-color material property (MP-2) at column 306, a third non-color material property (MP-3) at column 308. It will be understood that other instances of Table 320 of Color Map may include a greater number or fewer different non-color material properties.

As further shown in FIG. 4C, the first, second, and third non-color material properties (MP-1, MP-2, MP-3) are represented via Red, Blue, and Green color channels respectively. Accordingly, assigned colors printed at a single exterior voxel location (e.g. 1, 5, 10) or at a single group of exterior voxel locations may simultaneously represent three different non-color material properties MP-1, MP-2, MP-3. In some examples, this arrangement may be implemented via half-toning, such as via parameter 550 in FIG. 9).

In some examples, providing multiple assigned colors at a single exterior voxel location (or single group of exterior voxel locations) may be achieved via fluid dispenser 58 printing such multiple assigned colors independently and simultaneously at the selectable voxel location(s). Via the sample color mapping demonstrated in FIGS. 4B, 4C one can construct a complete color map for an entire 3D object or a pertinent portion of a 3D object.

Figure 4E:
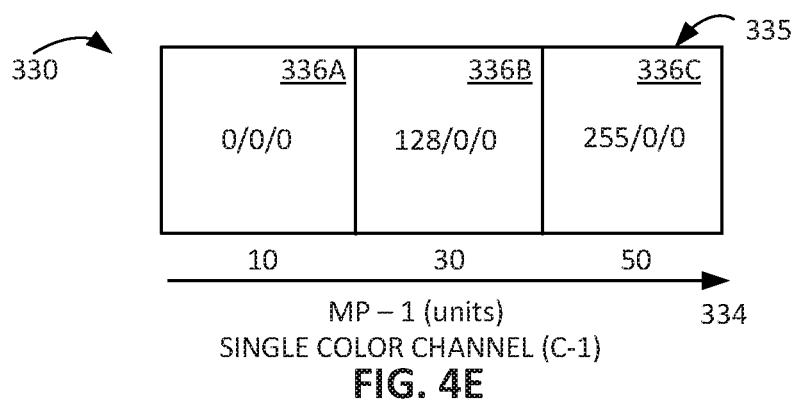

FIGS. 4D-4E are each a diagram schematically representing example color mapping. In some examples, such color mapping may be used to implement at least some of the features and attributes of at least some of the examples previously described in association with at least FIGS. 1-3 and later described in association with at least FIGS. 5-10.

As shown in FIG. 4D, diagram 320 comprises an x-axis 324 and a y-axis 322, with the x-axis 324 representing a first material property (MP-1) and a first color channel (C-1) and with the y-axis 322 representing a second material property (MP-2) and a second color channel (C-2). While the respective first and second material properties may comprise any one of a wide range of material properties, in the illustrated example the first material property (MP-1) comprises a mechanical property, such as stress expressed in units of MegaPascals (MPa), and the second material property (MP-2) also comprises a mechanical property, such as elongation expressed in units of a percentage (%). As further shown in FIG. 4D, some example values (e.g. 10, 30, 50 and 10, 20, 30) are provided for each of the respective first and second material properties.

Diagram 320 also comprises a grid 325 expressing different colors assigned to a particular combination of the first and second material properties (MP-1, MP-2). Each block (e.g. 326A, 328B, etc.) within grid 325 represents a single color, which in turn is expressed via a particular combination of values of the first and second color channels, such as 0/255/0, 128/128/0, etc. in a R/G/B color space or other multi-dimensional color space.

Figure 4F:
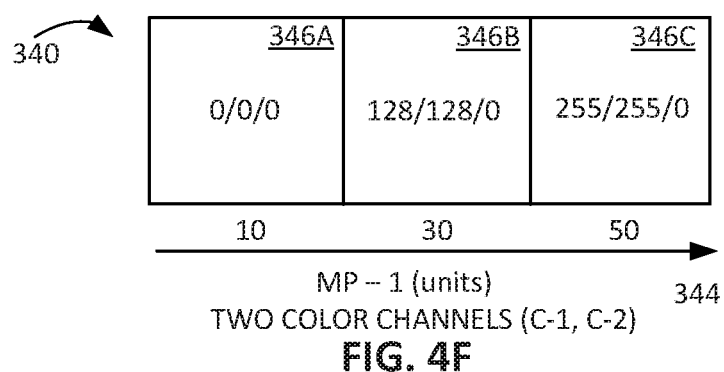

However, it will be understood, in at least this context, that a single color may be expressed via three color channels (e.g. Red, Green, Blue or Cyan, Magenta, Yellow). While not shown explicitly in FIG. 4D, a single color may be expressed via four channels (e.g. Cyan, Magenta, Yellow, and Black). In later examples, a single color (representing a single non-color material property) may be expressed via a single color channel (FIG. 4E) or a single color (representing a non-color material property) may be expressed via at least two color channels (FIG. 4F).

As shown in FIG. 4D, in the example in which the first material property (MP-1) comprises stress, as the stress increases in value (e.g. from 10 to 50), the value of the first color channel (e.g. Red) increases from 0 to 255. At the same time, in the example in which the second material property (MP-2) comprises elongation, as the elongation increases in value (e.g. from 10 to 30), the value of the second color channel (e.g. Green) increases from 0 to 255. Among other things, this arrangement illustrates that a single color (e.g. the color represented via block 328B in grid 325) may simultaneously represent two non-color material properties (e.g. stress of 30 MPA and elongation of 20%). In such examples, the single color is expressed via two color channels (e.g. Red, Green) in a multi-dimensional color space (e.g. R/G/B).

In some examples, via similar arrangements, a single color (e.g. one of blocks 326A-329C in grid 325) may represent a combination of three different non-color material properties when the color space defines three color channels. In some such arrangements, a third axis would be further implemented such that grid 325 would comprise a three-dimensional grid of blocks with the third axis representing the third non-color material property.

In some examples, via similar arrangements, a single color (e.g. one of blocks 326A-329C in grid 325) may represent a combination of fourth different non-color material properties when the color space defines four color channels (e.g. C/M/Y/K).

It will be understood that the values of the respective color channels in the grid 325 are representative and that values intermediate of those shown may be interpolated and/or expressed explicitly in a more comprehensive color map exhibiting a full range (e.g. 0 to 255) of numerical values of the color channels as they correspond to the values (of a full range) of the respective non-color material properties (represented by the respective colors in grid 325).

FIG. 4E is a diagram 330 including a grid 335 schematically representing example color mapping. In some examples, the color mapping represented via grid 335 (including blocks 336A-336C) comprises at least some of substantially the same features and attributes as previously described in association with at least FIG. 4D, except comprising a single color channel (C-1) mapped relative to a single non-color material property (MP-1) expressed along a single axis 334. Via this arrangement, different values of a single non-color material property (MP-1) may be represented via different colors (e.g. at blocks 336A, 336B, 336C) in which each different color is expressed via different values of a single color channel.

FIG. 4F is a diagram 340 schematically representing example color mapping. In some examples, the color mapping represented via diagram 340 comprises at least some of substantially the same features and attributes as previously described in association with at least FIG. 4D and/or 4E, except comprising two color channels (C-1, C-2) and a single non-color material property (MP-1). Via this arrangement, different values of a single non-color material property (MP-1) may be represented via different colors (e.g. at blocks 346A, 346B, 346C) in which each different color is expressed via two color channels (e.g. Red, Green) instead of via a single color channel (FIG. 4E).

Figure 5:
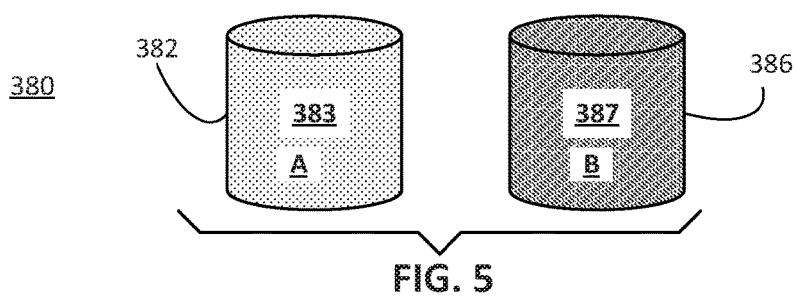
FIG. 5 is a diagram schematically representing a plurality of example 3D objects including a color surface representation.

FIG. 5 is a diagram schematically representing a plurality of example 3D objects 382, 386 each including its own respective different 3D color surface color representation. In some examples, 3D objects 382, 386 are formed via at least some of substantially the same features and attributes as previously described in association with at least FIGS. 1-4C.

In some examples, 3D object 382 comprises (at least) a first non-color material property and 3D object 386 comprises a different second non-color material property. In some examples, the first 3D object 382 is formed from a first build material exhibiting the first non-color material property and the second 3D object 386 is formed from a different, second build material exhibiting the different second non-color material property.

However, in some examples, the respective different material properties may be achieved via applying fluid agent(s) to a single build material.

As shown in FIG. 5, in some examples an external surface 383 of first 3D object 382 comprises a first color (A) to represent a first non-color material property of the first 3D object while an external surface 387 of second 3D object comprises a second color (B) to represent a different, second non-color material property of the second 3D object 386. As previously noted in some examples, selection of the first and second colors is independent of characteristics of the respective first and second non-color material properties, where such characteristics may comprise intrinsic characteristics in some examples.

However, in some examples, each 3D object 382, 386 in FIG. 5, comprises the same first non-color material property (whether implemented with or without a fluid agent), but each 3D object 382, 386 exhibits different values of the same material property. In such examples, the external surface 383 of first 3D object 382 comprises a first color (A) to represent a first value of a first non-color material property and a second color (B) at least partially define external surface 387 represents a different second value of the same first non-color material property. As previously noted in some examples, selection of the first and second colors is independent of intrinsic characteristics of the respective first and second values of the first non-color material property.

Accordingly, when considering a family of differently colored 3D objects as represented in FIG. 5, each member of the family may exhibit different non-color material properties (or different values of the same non-color material property). For instance, a family of tools (e.g. tweezers) may assign each family member with a different color to represent each different tweezer, which has a stiffness different than other tweezers in the family. This arrangement may enable quick visual recognition of the different material properties embodied in different members of a family of objects.

Figure 6A:
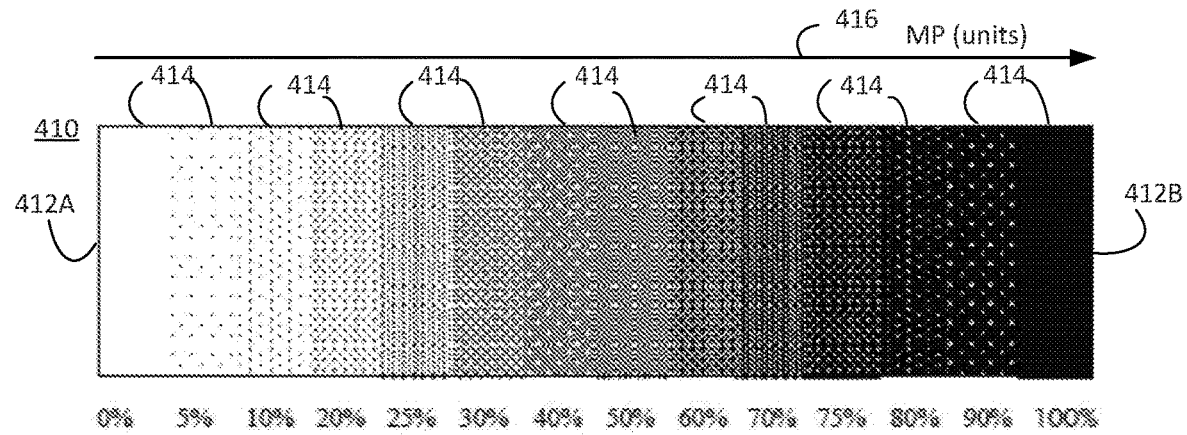
FIG. 6A is a diagram schematically representing an example discrete color gradient representation for at least a portion of an example 3D object.

FIG. 6A is a diagram schematically representing an example discrete color gradient representation 410 for at least a portion of an example 3D object. Representation 410 may be one implementation of a 3D color surface voxel representation which exhibits a monochromatic gradient and which may be specified via greyscale parameter (e.g. 552 in FIG. 9). However, in some examples, the gradient representation 410 may be expressed in full color via a color space parameter (e.g. 542 in FIG. 9) such as a RGB or CYMK color space, or other color spaces.

As shown in FIG. 6A, each discrete portion 414 of the gradient representation 410 exhibits a different percentage of color with the percentage increasing in discrete steps (e.g. 5 or 10% in one example) from a first end 412A to an opposite second end 412B of the (color map) of the 3D object. In some examples, these discrete steps in color change may facilitate human or machine vision recognition of a particular color which represents a particular portion of a 3D object and/or to readily distinguish different colors representing respective different portions of a 3D object which exhibit respectively different non-color material properties. Accordingly, in some examples the gradient representation may act as a color map when the values of a non-color material property (e.g. MP) or different non-color material properties are represented along a length of the gradient representation 410, as may be indicated in association with arrow 416.

At least some aspects of the examples demonstrated via FIG. 6A are associated with and/or may comprise example implementations of at least the respective color, greyscale, discrete and gradient functions 541, 552, 546, 548 of the color representation engine 540 later described in association with at least FIG. 9. In some examples, a threshold is established (e.g. via discrete parameter 546 in FIG. 9) to ensure the adjacent discrete portions (e.g. 414) have differences in color which are of a sufficient magnitude to ensure their unique recognition relative to each other, as well as a well-defined boundary between the adjacent discrete portions.

Figure 6B:
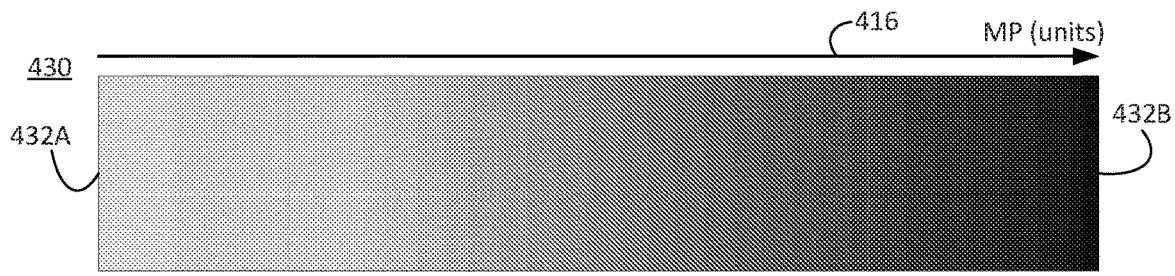
FIG. 6B is a diagram schematically representing an example continuous color gradient representation for at least a portion of an example 3D object.

FIG. 6B is a diagram schematically representing an example continuous color gradient representation 430 for at least a portion of an example 3D object. In some examples, the gradient representation 430 of FIG. 6B comprises at least some of substantially the same features and attributes as the discrete color gradient representation 410 in FIG. 6A. However, in the gradient representation 430 of FIG. 6B, the change in color (e.g. monochromatic in a greyscale example) from a first end 432A to an opposite second end 432B of the representation 430 (of the 3D object) may be continuous instead of discrete. At least some aspects of the example implementations of FIG. 6B are associated with and/or may comprise an example implementation of the respective color, greyscale, continuous and gradient functions 541, 552, 547, and 548 of the color representation engine 540 later described in association with at least FIG. 9.

In some examples, the gradient representations of FIGS. 6A, 6B may be appropriate when a value of a single non-color material property varies in an increasing manner, or in a decreasing manner, from a first end to an opposite second end of a 3D object. Such arrangements may enable quick visual recognition of a material property distribution throughout a 3D object.

Figure 7:
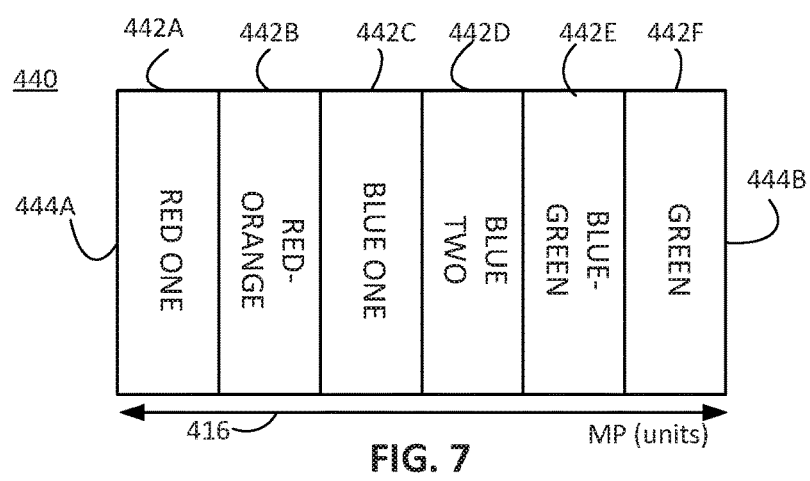
FIG. 7 is a diagram schematically representing an example discrete color representation for at least a portion of an example 3D object.

FIG. 7 is a diagram schematically represents an example non-gradient discrete color representation 440 (for at least a portion of an example 3D object), which may comprise one example implementation of a color 3D surface voxel representation. In some examples, the non-gradient color representation 440 may be expressed in full color via a color space such as RGB or CYMK, as represented by the named colors (e.g. RED ONE, RED-ORANGE, etc.) in the respectively different discrete portions 442A-442F in FIG. 7. In some examples, these discrete steps in color change may facilitate human or machine vision recognition of a particular assigned color for a particular portion of a 3D object and/or to distinguish different assigned colors for different portions of a 3D object which exhibit respectively different non-color material properties (which may be mapped along arrow 416). However, in some examples, the discrete non-gradient color representation 440 may be expressed monochromatically (instead of in full color) in which each discrete portion 442A-442F between opposite ends 444A, 444B may exhibit a different greyscale value. In some examples, a threshold is established (e.g. via discrete parameter 546 in FIG. 9) to ensure the adjacent discrete portions (e.g. 442A, 442B, etc.) have differences in color which are of a sufficient magnitude to ensure their unique recognition relative to each other, as well as a well-defined boundary between the adjacent discrete portions.

At least some aspects of the examples regarding FIG. 7 are associated with and/or provide example implementations of at least the respective color, greyscale, and discrete functions 541, 552, and 548 of a color representation engine 540 later described in association with at least FIG. 9.

FIG. 8A is a block diagram schematically representing an example control portion 460. In some examples, control portion 460 provides one example implementation of a control portion forming a part of, implementing, and/or managing any one of the devices, material dispensers, fluid dispensers, energy sources, imagers, instructions, engines, functions, parameters, and/or methods, as described throughout examples of the present disclosure in association with FIGS. 1-7 and 8B-10.

In some examples, control portion 460 includes a controller 462 and a memory 470. In general terms, controller 462 of control portion 460 comprises at least one processor 464 and associated memories. The controller 462 is electrically couplable to, and in communication with, memory 470 to generate control signals to direct operation of at least some the devices, material dispensers, fluid dispensers, energy sources, imagers, instructions, engines, functions, parameters, and/or methods, as described throughout examples of the present disclosure. In some examples, these generated control signals include, but are not limited to, employing instructions 471 stored in memory 470 to at least direct and manage additive manufacturing of 3D objects in the manner described in at least some examples of the present disclosure. In some examples, at least some instructions 471 are implemented via manufacturing engine 500 in FIG. 9.

In response to or based upon commands received via a user interface (e.g. user interface 480 in FIG. 8B) and/or via machine readable instructions, controller 462 generates control signals to implement additive manufacturing of a 3D object in accordance with at least some of the examples of the present disclosure. In some examples, controller 462 is embodied in a general purpose computing device while in some examples, controller 462 is incorporated into or associated with at least some of the devices, components, material dispensers, fluid dispensers, energy sources, imagers, instructions, engines, functions, parameters, and/or methods, etc. as described throughout examples of the present disclosure.

For purposes of this application, in reference to the controller 462, the term "processor" shall mean a presently developed or future developed processor (or processing resources) that executes sequences of machine readable instructions contained in a memory. In some examples, execution of the sequences of machine readable instructions, such as those provided via memory 470 of control portion 460 cause the processor to perform actions, such as operating controller 462 to implement additive manufacturing of 3D objects as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium), as represented by memory 470. In some examples, memory 470 comprises a computer readable tangible medium providing non-volatile storage of the machine readable instructions executable by a process of controller 462. In other examples, hard wired circuitry may be used in place of or in combination with machine readable instructions to implement the functions described. For example, controller 462 may be embodied as part of at least one application-specific integrated circuit (ASIC). In at least some examples, the controller 462 is not limited to any specific combination of hardware circuitry and machine readable instructions, nor limited to any particular source for the machine readable instructions executed by the controller 462.

In some examples, control portion 460 is entirely implemented within or by a stand-alone device, which has at least some of substantially the same features and attributes as device 20 as previously described in association with at least FIGS. 1-7 and at least FIGS. 8B-10. In some examples, the control portion 460 is partially implemented in the device 20 and partially implemented in a computing resource separate from, and independent of, the device 20 but in communication with the device 20.

In some examples, control portion 460 includes, and/or is in communication with, a user interface 480 as shown in FIG. 8B. In some examples, user interface 480 comprises a user interface or other display that provides for the simultaneous display, activation, and/or operation of at least some of the devices, components, material dispensers, fluid supply, fluid dispensers, energy sources, imagers, instructions, engines, functions, parameters, and/or methods, etc. as described in association with FIGS. 1-7 and 8B-10. In some examples, at least some portions or aspects of the user interface 480 are provided via a graphical user interface (GUI), and may comprise a display 484 and input 482.

FIG. 9 is a block diagram schematically representing an example manufacturing engine 500. In some examples, the manufacturing engine 500 directs and manages additive manufacturing of a 3D object, including layering materials and/or dispensing fluid agents relative to a receiving surface to additively form a three-dimensional (3D) object. In some examples, manufacturing engine 500 provides at least some example implementations of instructions 471 in memory 470 associated with control portion 460 (FIG. 8A).

In some examples, manufacturing engine 500 provides one example by which at least some examples previously described in association with at least FIGS. 1-8B may be implemented.

As shown in FIG. 9, in some examples manufacturing engine 500 comprises a material dispenser engine 510, fluid dispenser engine 520, color representation engine 540, material property engine 560, composition engine 580, energy function 590, and/or construction engine 600.

As shown in FIG. 9, in some examples the material dispenser engine 510 comprises a build material(s) function 512 to specify which build materials are used to form layers of a 3D object. In some examples, a single build material may be used to form a 3D object. In some examples, multiple different build materials may be used to form a 3D object. In some examples, a single type of build material may be used to form a 3D object but different portions of the 3D object may be formed using variations of the single type of build material in which a first portion of the 3D object exhibits a first value of a non-color material property of the single type of build material and a second portion of the 3D object exhibits a different second value of the same non-color material property of the single type of build material.

In general terms, the material dispenser engine 510 enables the selection of materials to be deposited as a build material onto a receiving surface and/or previously formed layers of a partially formed 3D object.

In some examples, the material dispenser engine 510 comprises a material parameter 512. Via the material parameter 512, the manufacturing engine 500 specifies which material(s) and the quantity of such material which can be used to additively form a body of the 3D object. In some examples, these materials are deposited via material dispenser 50 of device 10 (FIG. 1).

In some examples, the material controlled via material parameter 512 of material dispenser engine 510 may comprise polymers, ceramics, etc. having sufficient strength, formability, toughness, etc. for the intended use of the 3D object with at least some example materials being previously described in association with at least FIG. 1.

As shown in FIG. 9, in some examples the fluid dispenser engine 520 may specify which fluid agents are to be selectively deposited onto a previously deposited layer of build material and/or in association with other agents. In some examples, such agents are deposited via fluid dispenser 58 (FIG. 1). In some examples, the dispenser engine 520 comprises a first fluid agent engine 522 and a second fluid agent engine 530.

In some examples, the first fluid agent engine 522 controls dispensing via dispenser 58 of a first fluid agent (62 in FIG. 1) used as part of forming layers 82A (FIGS. 1-7) of a build material in additively manufacturing a 3D object. In some examples, the first fluid agent engine 522 and/or second fluid agent engine 530 may dispense fluid agents (via dispenser 58 in FIG. 1) according to a detailing parameter 526, a fusing parameter 528, and/or other parameter 529.

In some examples, the fusing parameter 528 controls dispensing of a fusing agent which may facilitate fusing of the layered first materials (e.g. a build material) into a monolithic structure, while the detailing parameter 526 controls dispensing of a detailing agent to complement fusing and/or otherwise modify an appearance of the layered build materials. In some examples, other agents or additional agents are dispensed selectively as controlled via other parameter 528.

In some examples, the first fluid agent engine 522 comprises a colors parameter 524 to specify dispensing of colors via fluid dispenser 58 according to various color-related functions and parameters of the manufacturing engine 500 generally, and with particular respect to the color representation engine 540 (FIG. 9). For instance, such colors may comprise the assigned colors (applied to at least partially define an external surface) and which are intended to represent corresponding non-color material properties of interior portions of a 3D object.

In some examples, the second fluid agent engine 530 controls dispensing of a second fluid agent (e.g. 62 in FIG. 1), such as via a second fluid agent function 531 and/or a multiple fluid agent function 538.

In some examples, the second fluid agent function 531 comprises a materials parameter 532 to control the type(s) and quantity of materials which may be incorporated with the dispensed second fluid agent, in some instances. These various materials exhibit different non-color material properties (e.g. electrical, mechanical, chemical, etc.) which may be infused into the various layers of the build material, as further described below.

In some examples, the materials parameter 532 may control a fraction (536) of solids (534) relative to the overall volume of second fluid agent dispensed. Accordingly, this control may indirectly determine a volume of ink flux (e.g. fluid components) in the overall volume of dispensed second fluid agent. With respect to the various fluid agents and/or various properties controllable via fluid dispenser engine 520, it will be understood that fluid dispenser 58 (FIG. 1) of device 20 may be configured with correspondingly separate reservoirs, delivery channels, etc. to enable such separate fluid agents and/or additives to be selectively dispensed as desired during the additive manufacturing of the 3D object. Similarly, to the extent that different build materials are used per parameter 512 of material dispenser engine 510, then each different material may be contained in separate reservoir until deposited via material dispenser 50 (FIG. 1).

In some examples, the color representation engine 540 at least partially controls and directs the manner in which various colors are assigned to represent various non-color material properties of various 3D objects (or portions thereof). In some examples, at least some examples of the present disclosure may be implemented via color representation engine 540. In some examples, the color representation engine 540 comprises a color(s) function 541, color space function 542, an object function 543, a portion function 544, a value function 545, a discrete function 546, a continuous function 547, a gradient function 548, a half-toning function 550, a greyscale function 552, and a wavelength function 554, and/or a color map function 555, which includes a table parameter 556 and a rule parameter 557.

In some examples, the color map function 555 of color representation engine 540 implements a mapping of the colors (541) relative to objects (543) and/or portions (544) of 3D objects in association with non-color material properties (engine 560). In some examples, such mapping may be implemented in association with values 545 of non-color material properties per engine 560.

In some examples, the color map function 555 of color representation engine 540 implements such mapping according to a selectable color space (e.g. RGB, CYMK, etc.) per at least color space function 542. In some examples, such color map(s) are at least partially implemented via a table per table parameter 556 and/or via a color mapping rule via rule parameter 557, as shown in FIG. 9. At least some aspects of example implementations of the color map function 555 (and functions 541-552) were previously described in association with at least FIGS. 4B-4C and/or expressed in association with at least FIGS. 6A-7.

In some examples, per color mapping function 555, the color mapping may be implemented such that the one-to-one correspondence of the color-to-material property mapping can be expressed via any of a variety of rules provided that the color-to-material property relationship is monothonic.

In some examples, via wavelength function 554 of color representation engine 540, at least some of the dispensed color (to represent a non-color material property) may be invisible to unaided human vision but otherwise visible via machine vision and/or with the assistance of ultraviolet (UV) light. In this way, the color information is retrievable when desired but is otherwise visually unobtrusive.

In some examples, the color representation engine 540 comprises a half-toning function 550 to cause the fluid dispenser 58 to dispense multiple different color agents via half-toning in at least selectable locations of an external surface 88 of a first portion (e.g. 71A in FIG. 1, 2) to simultaneously represent multiple, different non-color material properties or to simultaneously represent multiple, different values of a single non-color material property.

In general terms, the composition engine 580 of manufacturing engine 500 enables the selection of attributes by which the selected fluid agents are deposited via fluid dispenser engine 520. For instance, in some examples the composition engine 580 comprises a location parameter 581, a size parameter 582, a shape parameter 583, a quantity parameter 585, and a spacing parameter 586. The location parameter 581 can specify a location at which the various agents and/or a structural feature of the 3D object is located. For instance, the location parameter 581 can specify a location at which a color is to deposited at an external surface or at which a fusing agent is dispensed to cause fusing (e.g. via melting, via sintering, etc.) of a layer of material. Meanwhile, the size parameter 582 can specify a size of the area over which the particular agent (e.g. color, detailing, etc.) is deposited. The size can be specified as an absolute quantity or as a relative quantity, i.e. a size relative to a size or volume of the surrounding material not receiving a particular agent.

In some examples, the shape parameter 583 enables specifying a shape over which a particular agent is deposited, which can be absolute or relative to the general shape of the 3D object. In some examples, the quantity parameter 585 enables specifying a quantity of locations at which a particular agent is deposited on a layer of material. In some examples, the spacing parameter 586 enables specifying a spacing between multiple locations at which a particular agent is deposited.

As shown in FIG. 9, in some examples manufacturing engine 500 may comprise a material property engine 560 to specify which material properties are already exhibited by a build material and/or to be exhibited by such build materials after dispensing fluid agents.

In some examples, at least some portions of at least some layers of the build material may already at least partially exhibit the material property (e.g. mechanical, electrical, chemical) specified for the selected/targeted locations without, or prior to, any operation or action by the fluid dispenser 58 and material property engine 560. Hence, in some examples various parameters of the materials property engine 560 track and/or reflect such already existing material properties of the 3D object.

In some examples, material property engine 560 comprises a mechanical parameter 561, electrical parameter 570, chemical parameter 577, multi-property parameter 578, and degree parameter 579.

In some examples, the mechanical parameter 561 may comprise a structure parameter 562, strength parameter 563, and/or a hardness parameter 564.

In some examples, the structure parameter 562 may specify that at least some portions of at least some of the formed layers exhibit a structural framework, such as defining a latticework, foam structure, etc. In some examples, some such structures may be implemented on a selectable scale (e.g. microscale, meso-scale, macro-scale) depending on the size and shape of the 3D object and/or depending on the mechanical, electrical, and/or chemical property to be influenced or defined. In some examples, the nature (e.g. lattice) of the structural framework is the primary feature of interest for the 3D object and at least partially defines a non-color material property which can be represented via an assigned color at the corresponding external surface of the 3D object.

However, in some examples, the structural framework provides a function of the 3D object that acts as the primary structural feature of interest and which at least partially defines a non-color material property. For instance, building the layers of at least a portion of a 3D object as a latticework or foam may produce a filter, which is the primary material property of interest which can be represented via an assigned color at the corresponding external surface of the 3D object.

At least some of these structural properties may selectively cause the non-material property of the build material (and/or build material influenced by fluid agents) to exhibit mechanical, electrical and/or chemical properties which may not ordinarily considered an intrinsic non-color material property of the particular build material (and/or build material influenced by fluid agents) forming a 3D object.

In some examples, such structural properties may influence and/or define other properties (e.g. electrical, chemical, other mechanical properties) specifiable by the material property engine 560. In some examples, the structure parameter 564 may specify and cause implementation of such structural properties in a manner to mimic or emulate other properties (e.g. acoustic properties, etc.).

In some examples, the mechanical property parameter 561 may comprise a magnetic parameter 565, an optical parameter 566, a thermal parameter 567, and/or other parameter 568. Via such parameters, the second fluid agent engine 530 may select and/or control the extent to which the second fluid agent (including a second material in some examples) exhibits various magnetic, optical, thermal, and/or properties.

It will be understood that other, different mechanical properties also may be selected and/or controlled via mechanical property parameter 561. Accordingly, parameters 562, 563, 564, 565, 566, 567, 568 do not define the full range of mechanical properties which may be selected and/or controlled via mechanical property parameter 561.

In some examples, a material property of at least a portion of a 3D object may be at least partially specified and/or at least partially determined via an electrical property parameter 570. For instance, via parameter 570, the material property may comprise electrically conductive properties (571), an electrically insulative properties (572), semi-conductive properties (574), and/or other electrical properties. Such material properties may be used to form various circuitry elements within and/or on the 3D object and/or may be used to form other non-circuitry features.

In some examples, a material property of at least a portion of a 3D object may be at least partially specified and/or at least partially determined via the chemical property parameter 577. For instance, via parameter 577, the second fluid agent may control and/or comprise chemical features, such as but not limited to, corrosion, reactivity, etc.

In some examples, some of the specifiable mechanical, electrical, and/or chemical properties may influence and/or at least partially define at least some of the other respective mechanical, electrical, and/or chemical properties of the formed layers.

In some examples, a material property of at least a portion of a 3D object may be specified via a multi-property parameter 578 to select or implement multiple different properties for selectable voxel locations. In some examples, just one selectable property may be implemented for one group of voxel locations, with other selectable properties being implemented at other groups of voxel locations.

The degree parameter 579 may specify a degree to which any particular material property specified via engine 560 is exhibited in the 3D object, such that it will be understood that the presence or absence any given material property is not expressed in a strictly binary manner, in at least some examples.

It will be understood that other, different mechanical, electrical, and/or chemical properties also may be selected and/or controlled via material property engine 560. Accordingly, the specifically identified mechanical, electrical, chemical parameters 561, 570, 577 do not necessarily define the full range of non-color material properties which may be selected and/or controlled via material property engine 560.

In some examples, any one of the properties (e.g. 561, 570, 577, 578, in FIG. 9) selectable via second fluid agent engine 530 also may be implemented via the first fluid agent in association with the other parameter 528 of first fluid engine 522 and/or also may be already incorporated with the build material deposited as one of the first layers (e.g. 82A) via the material dispenser 50 (FIG. 1). Such implementation may complement the various properties (e.g. 561, 570, 577, 578 in FIG. 9) implemented via second fluid agent engine 530 (FIG. 9) of dispenser 58 (FIG. 1).

In some examples, any one of, or a combination of, at least some of the selectable non-color material properties (e.g. 561, 570, 577, 578 in FIG. 9) may be at least partially implemented via a selectable combination and/or selectable proportions of at least detailing agents, fusing agents, other agents, and/or color agents per respective parameters 524, 526, 528, 529 shown in FIG. 9. It also will be understood that in at least some examples, the fluid agents dispensed via the respective first and second fluid engines 522, 530 of fluid dispenser engine 520 may be dispensed together as a single volume of droplets onto the selectable locations. In addition, in at least some examples, the identification of separate "first" and "second" fluid engines 522, 530 does not necessarily imply that the fluids dispensed via operation of the respective first and second fluid engines 522, 530 are functionally independently. In other words, in at least some examples, at least some of the fluid agents dispensed per first fluid engine 522 may work in a complementary manner with at least some of the fluid agents dispensed per second fluid engine 530. Moreover, the terms "first" and "second" regarding the fluid engines 522, 530 do not imply a particular order of dispensing, in at least some examples.

It will be understood that in some examples the material dispenser engine 510 and fluid dispenser engine 520 are not limited to specifying the types of materials, agents, etc. associated with parameters and engines (e.g. 512, 526, 528, 529, 522, 530, 560) shown in FIG. 9, but instead may specify any type of material, agent, etc. conducive to additively manufacturing a 3D object, with such type of materials, agents, etc. depending on the size, type, shape, use, etc. of the 3D object, and depending on the particular type of method used to perform the additive manufacturing of the 3D object.

With respect to at least the various engines and functions (and their respective parameters) represented via at least blocks 510, 520, 540, 560, 580, 590, 600 in FIG. 9, it will be understood that in at least some examples the various engines, functions, parameters may be arranged differently (e.g. in different groupings, combinations, separated, etc.) than shown in manufacturing engine 500 of FIG. 9 while still implementing the actions, arrangements, features, attributes, etc. as previously described in association with at least FIG. 9 and/or as described throughout at least some of the examples of the present disclosure.

In general terms, the energy engine 590 of manufacturing engine 500 (FIG. 9) may enable specifying various processing steps on the deposited materials and agents, such as applying energy to cause fusing, etc. of the deposited materials.

In some examples, the energy engine 590 may control an amount of time that energy from energy source (e.g. 210 in FIG. 3A) is emitted (i.e. irradiation) toward the material, agents, etc. on the receiving surface 42. In some examples, the energy source 210 may irradiate the material layer in a single flash or in multiple flashes. In some examples, the energy source 210 may remain stationary (i.e. static) or may be mobile. In either case, during such irradiation, the energy engine 590 controls the intensity, volume, and/or rate of irradiation.

As shown in FIG. 9, in some examples the manufacturing engine 500 comprises a construction engine 600 which may at least partially control and/or influence additive manufacturing of 3D object. As shown in FIG. 9, in some examples the construction engine 600 comprises an original manufacture function 610, an image function 620, an analysis function 622, a representation function 624, and/or a reconstruction engine 630.

In some examples, the original manufacture function 610 directs additive manufacturing of an original 3D object, i.e. a 3D object which is not a replica made via a reconstruction analysis/production. Accordingly, in some examples, the original manufacture function 610 comprises a design parameter 612 to specify the material parameters (e.g. via engines 510, 560), fluid parameters (e.g. engine 520), color representation (e.g. engine 540), etc. by which an original 3D object will be additively manufactured to include a 3D color surface voxel representation of non-color material properties exhibited by the manufactured 3D object.

In some examples, the image function 620 of construction engine 600 may receive and/or direct obtaining a color 3D image of a desired color 3D object to produce an original color 3D object or to produce a 3D replica of an already formed color 3D object. In some examples, the image function 620 does so in cooperation with imager 222 in FIG. 3B.

In some examples, the analysis function 622 controls analyzing a color 3D image for which colors are present on the color 3D object, as well as the location, size, shape, quantity, spacing of the identified portions exhibiting a particular color(s). In some examples, this analysis function 622 may be implemented and/or operated in coordination with at least color representation engine 540 and/or composition engine 580. Via this analysis, the construction engine 600 may then determine, via representation function 624, a 3D color surface voxel representation, which expresses the manner in which the various identified color(s) represent various non-color material properties of various portions of the color 3D object (which is the subject of the 3D image). In some examples, the representation function 624 may be implemented and/or operated in coordination with at least color representation engine 540, material property engine 560, and/or composition engine 580.

Using this information and via replica function 632, a color 3D replica of the color 3D object from the 3D image is additively manufactured via at least some examples of the present disclosure. In some examples, when desired such a 3D replica may be produced via replica function 632 on a different scale, which is larger or smaller than the original part from which the color 3D image was taken. Such differently scaled replicas may be useful for display, travel, archiving, etc.

In some examples, while maintaining a one-to-one correspondence between the originally assigned color(s) and their respectively represented non-color material properties, via replica function 632 the 3D replica may be produced with substitute colors when desired provided that a new color map expressing the substitution is produced for the recipient of the replica.

It will be understood that various functions and parameters of construction engine 600 may be operated interdependently and/or in coordination with each other, in at least some examples.

Figure 10:
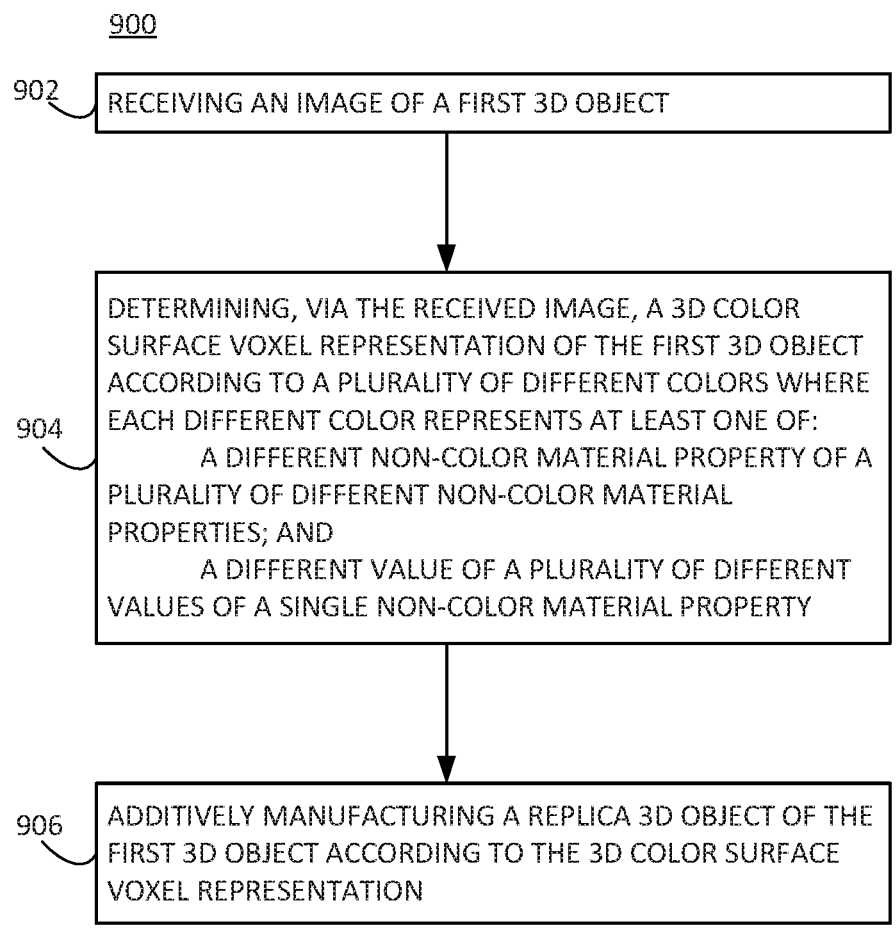
FIG. 10 is a flow diagram schematically representing an example method of reconstructing a 3D object.

FIG. 10 is a flow diagram schematically representing an example method 900 of additive manufacturing a 3D object. In some examples, method 900 is performed via at least some of the devices, components, material dispensers, fluid dispensers, energy sources, imagers, control portions, instructions, engines, functions, parameters, methods, etc. as previously described in association with at least FIGS. 1-9. In some examples, method 900 is performed via at least some of the devices, material dispensers, fluid dispensers, energy sources, imagers, control portions, instructions, engines, functions, parameters, methods, etc. other than those previously described in association with at least FIGS. 1-9. In some examples, method 900 is implemented via at least a manufacturing engine, such as manufacturing engine 500 in FIG. 9 and/or instructions 471 in FIG. 8A.

In some examples, the method of additively manufacturing a 3D object further comprises a method of reconstructing a 3D object.

As shown at 902 in FIG. 10, method 900 comprises receiving an image of a first 3D object. As shown at 904, method 900 comprises determining, via the received image, a 3D color surface voxel representation of the first 3D object according to a plurality of different colors. In some examples, each different color represents a different non-color material property of a plurality of different non-color material properties while in some examples, each different color represents a different value of a plurality of different values of a single non-color material property. As shown at 906, in some examples, method 900 comprises additively manufacturing a second 3D object, which is a 3D replica of the first 3D object according to the 3D color surface voxel representation.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A device comprising:
   a material dispenser;
   a fluid dispenser; and
   a control portion including a non-transitory medium to store machine readable instructions and a processing resource to execute the stored instructions to cause:
   the material dispenser to dispense a powder build material, layer-by-layer, to at least partially additively form a first 3D object;
   the fluid dispenser to dispense at least one fluid agent onto the dispensed powder build material at:
   first selectable voxel locations of the respective layers, layer-by-layer, to at least partially define an external surface of the first 3D object as a first color to represent at least two different non-color material properties, including a first non-color material property, of at least a first portion of the first 3D object, wherein the first color is expressed via at least two different color channels in a multi-dimensional color space in which a first color channel represents the first non-color material property and a second color channel represents a second non-color material property, wherein the first selectable voxel locations comprise exterior voxel locations; and
   second selectable voxel locations of each respective layer, layer-by-layer, to influence the first non-color material property at the second selectable voxel locations, which comprise interior voxel locations.

2. The device of claim 1, the stored instructions are to cause the material dispenser to form a plurality of 3D objects, including the first 3D object and a second 3D object, wherein the first color is to represent a first value of the first non-color material property of the first 3D object, and
   wherein the stored instructions are to cause the fluid dispenser to dispense, in at least selectable exterior voxel locations to at least partially define an external surface of the second 3D object, the first fluid agent as a second color to represent a second value of the first non-color material property of the second 3D object, wherein selection of the second color is independent of characteristics of the first non-color material property.

3. The device of claim 1, wherein the stored instructions are to cause the fluid dispenser to dispense, in at least selectable exterior voxel locations to at least partially define the external surface of the first 3D object, the second fluid agent as a second color to represent a second non-color material property of a second portion of the 3D object, wherein selection of the second color is independent of characteristics of the second non-color material property.

4. The device of claim 3, the stored instructions are to cause the material dispenser to at least partially form at least the first portion of the first 3D object with the powder build material as a first build material exhibiting the first non-color material property and to at least partially form the second portion of the first 3D object with the powder build material as a second build material exhibiting the second non-color material property.

5. The device of claim 3, wherein the stored instructions are to cause the material dispenser to build substantially the entire first 3D object via the powder build material as a single build material, and the stored instructions are to cause the fluid dispenser to dispense a first instance of the at least one fluid agent to at least partially define the first portion to produce the first non-color material property in the first portion and to dispense a second instance of the at least one fluid agent to at least partially define the second portion to produce the second non-color material property in the second portion.

6. The device of claim 1, wherein the stored instructions are to cause the first color to represent a first value of the first non-color material property for the first portion, and the stored instructions are to cause the fluid dispenser to dispense, in at least selectable exterior voxel locations to at least partially define the external surface of the first 3D object, the second fluid agent as a second color to represent a different, second value of the first non-color material property for a second portion of the first 3D object, wherein selection of the second color is independent of characteristics of the first non-color material property.

7. The device of claim 1, the stored instructions are to cause the dispenser to dispense the at least one fluid agent to include multiple different colors, including the first color, via half-toning at the exterior voxel locations over at least the first portion to simultaneously represent at least one of:
   respective multiple, different non-color material properties, wherein each different color corresponds to a respective one of the different non-color material properties; and
   respective multiple, different values of a single non-color material property.

8. The device of claim 1, wherein the first selectable voxel locations at which the at least one fluid agent is dispensed further comprise the exterior, second selectable voxel locations of each respective layer at which the at least one fluid agent is dispensed including the first color.

9. The device of claim 1, further comprising an energy source, wherein the stored instructions are to cause:
   the fluid dispenser to selectively dispense the at least one fluid agent as a fusing agent onto the dispensed powder build material on a layer-by-layer basis; and
   the energy source to apply energy after the dispensing of the at least one fluid agent to cause fusion of the dispensed powder build material and the at least one fluid agent at at least the first and second selectable voxel locations.

10. A device comprising:
    a material dispenser;
    a fluid dispenser; and
    a control portion including a non-transitory medium to store machine readable instructions and a processing resource to execute the stored instructions to cause:
    the material dispenser to dispense a powder build material, layer-by-layer, to at least partially additively form a first 3D object;
    the fluid dispenser to dispense onto the dispensed powder build material, layer-by-layer, at least one fluid agent at selectable exterior voxel locations of the respective layers to at least partially define an external surface of the first 3D object as a first color to represent a first non-color material property of at least a first portion of the first 3D object;

the first color to represent at least two different non-color material properties, including the first non-color material property and a second non-color material property, at the selectable exterior voxel locations; and the first color to be expressed via at least two different color channels in a multi-dimensional color space in which a first color channel represents the first non-color material property and a second color channel represents the second non-color material property.

11. The device of claim 10, wherein the stored instructions are to cause:

the first color channel to correspond to a respective first one of the colors of the multi-dimensional color space and to include a predetermined range of color values, wherein each value within the predetermined range of color values of the first color channel represents a value within a predetermined range of values of the first non-color material property; and a second color channel to correspond to a respective second one of the colors of the multidimensional color space and including a predetermined range of color values, wherein each value within the predetermined range of color values of the second color channel represents a value within a predetermined range of values of the second non-color material property.

* * * * *